Patented July 28, 1942

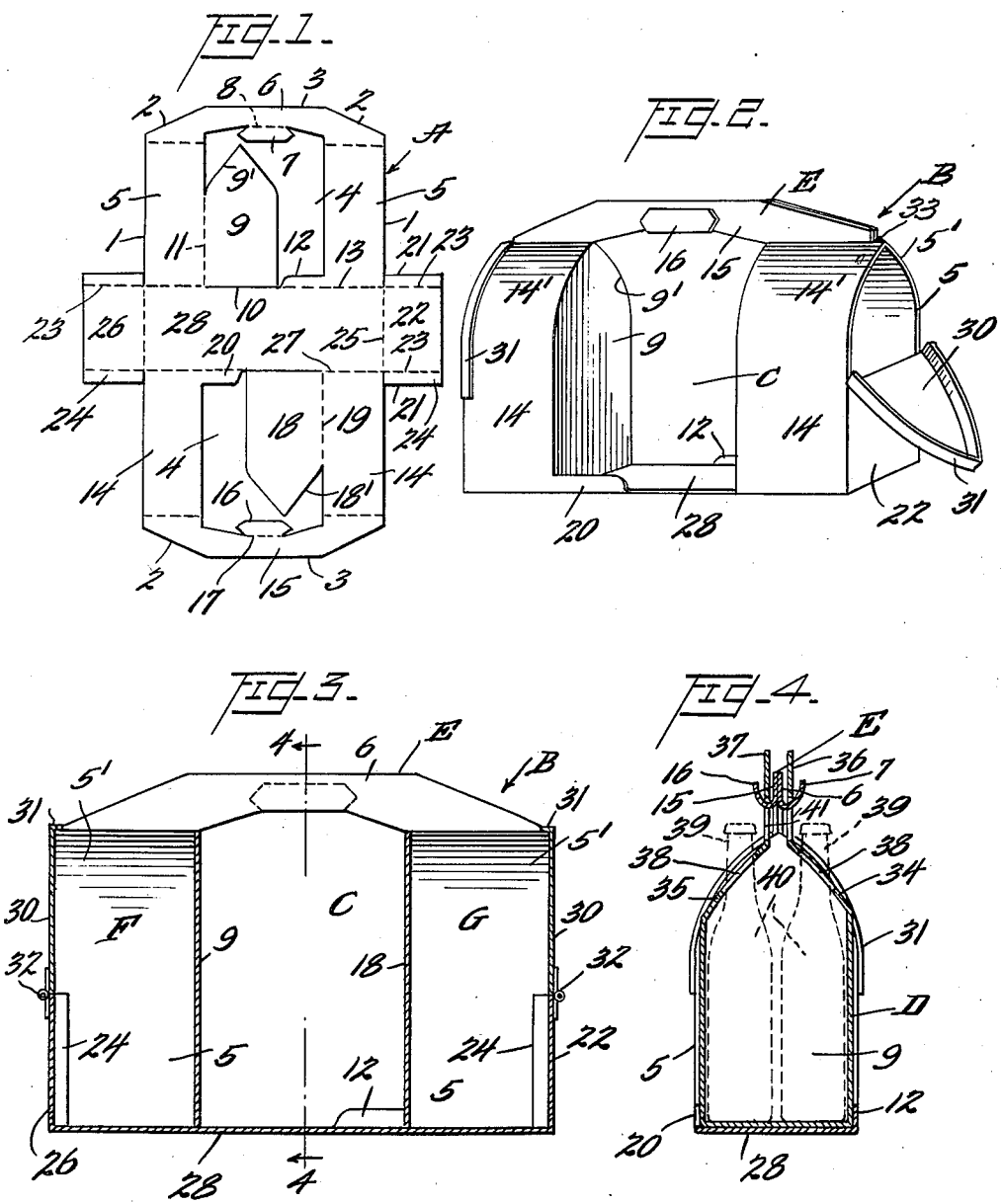

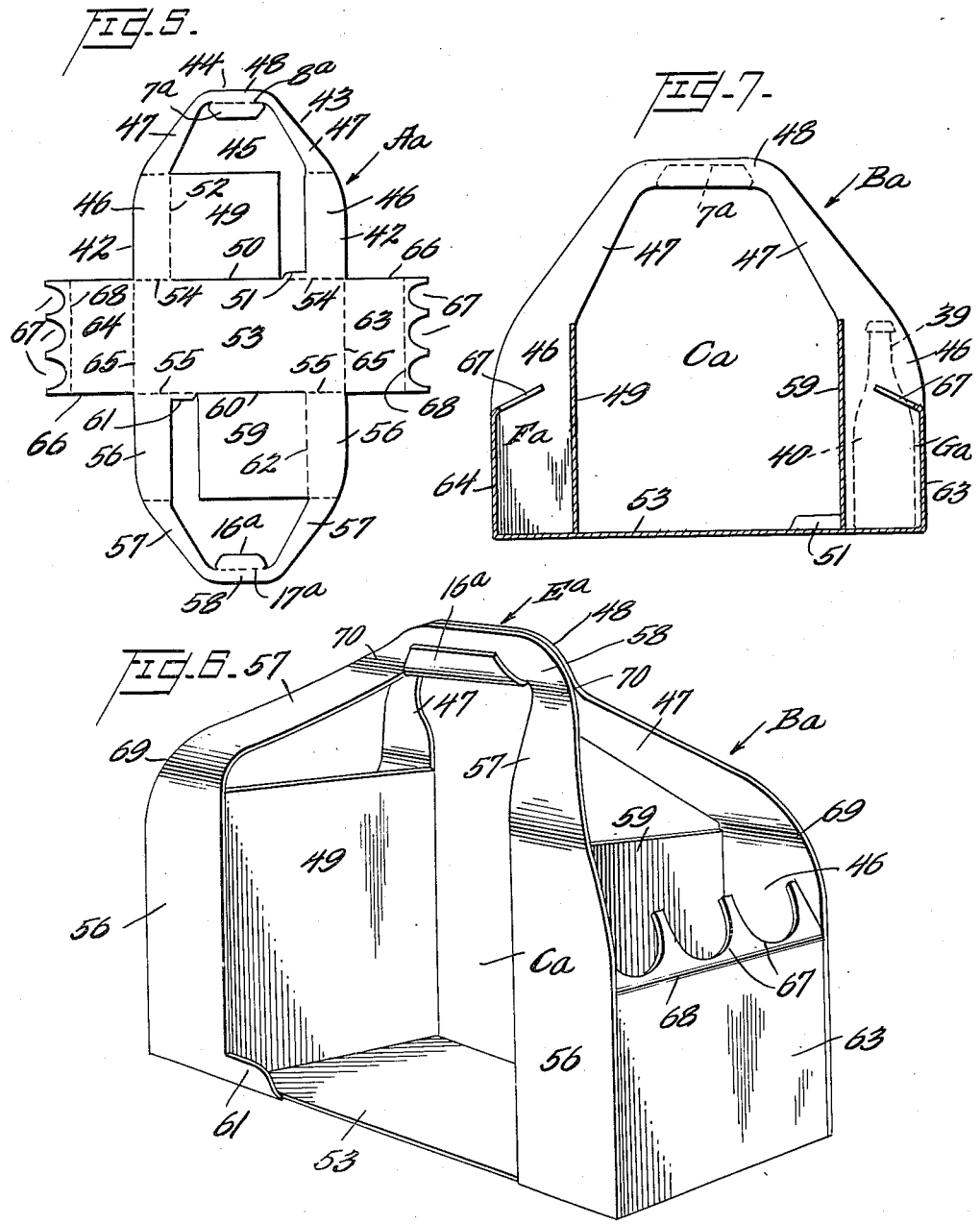

2,291,207

UNITED STATES PATENT OFFICE 2,291,207

FOOD AND BOTTLED BEVERAGE CARRIER

Walpole Brewer, Miami Beach, Fla.

Application May 21, 1940, Serial No. 336,445

4 Claims. (Cl. 229—52)

Generically this invention relates to lunch boxes but it more especially is directed to a combination beverage carton and lunch carrier.

One of the principal objects of this invention is the provision of a combination carrier having an opening to receive a carton package containing bottled soft drinks and the like, and means carried by the handle portion of the carrier adapted to coact with the handle structure of the carton to effect a combined handle whereby the carrier and carton may be transported as a unitary carrier.

Another object of this invention is the provision of a carrier having end compartments for food and the like, handle means connecting the upper ends of the compartments and a bottom portion connecting the lower ends of the compartments, the space intermediate said compartments adapted to receive a bottle-containing carton, the handle portion of the carton coacting with the carrier handle to effect a unitary handle structure.

A still further object of this invention is the provision of a combination carrier adapted to be stamped from sheet metal, cardboard, or the like, with parts folded and united to form a pair of spaced compartments connected at the lower ends by a bottom structure and at their upper ends by a handle structure, the space intermediate the compartments designed to receive a bottle-carrying carton and forming therewith a unitary handle structure, the configuration of the carrier conforming to that of the exposed portions of the carton so as to constitute continuations thereof and effect therewith a composite lunch and bottled beverage carrier without concealing the indicia carrying surfaces of the carton.

Another object of this invention is the provision of a modified form of carrier having spaced compartments adapted to carry bottled beverages with means engaging the respective bottles to maintain them in normal upright position, the space intermediate said compartments adapted to carry a container for food and the like or a carton of bottles so that, if desired, the entire capacity of the carrier may be utilized as a bottled beverage carrier especially adaptable for picnics, outings, and the like.

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Fig. 1 is a blank from which is formed the combination food and beverage carton carrier illustrated in Fig. 2.

Fig. 2 is a perspective view of my improved combination food and carton carrier.

Fig. 3 is a longitudinal section.

Fig. 4 is a cross section on the line 4—4 of Fig. 3.

Fig. 5 is a modified form of blank.

Fig. 6 is a perspective view of the modified carrier.

Fig. 7 is a longitudinal vertical section of the device shown in Fig. 6.

Briefly, I have designed a combination food and carton package carrier, susceptible of use as a lunch kit, a food container and beverage carton carrier, or as a bottled beverage carrier only, adaptable not only as a workman's lunch carrier but as a food and/or bottled beverage carrier for picnics, automobile trips, boating, and the like, constructed from a blank of suitable material, folded and united to form a compartment at each end of the carrier, with the configuration of the side and handle portions substantially conforming to those of the carton, means carried by the carrier handle for insertion through the openings in the carton handle portions which not only maintain the carton in position but permits the carton and the carrier to be carried in the same manner when combined as when carried separately, and whereby the indicia carrying side and handle surfaces of the carton are as visible when positioned in the carrier as when the carton is carried alone, and with slight modification the end compartments may be adapted to carry the bottles and the central portion food or the like without departing from the spirit of the invention.

In the illustrated embodiment characterizing this invention there is shown a blank A from which is constructed the carrier B having space C in which is adapted to be carried a bottle-containing carton D.

The blank A is cut along its outer edges as at 1, 2, and 3 and formed with a cut out portion 4 to form the side portions 5, handle portion 6, carton handle engaging lug 7 foldable on line 8, and compartment inner wall 9 cut along the line 10 and foldable on line 11, and carton or other container retaining lug 12, as will be apparent. This forms one side of the carrier or container and the inner wall of one of the compartments when folded on line 13. The other side is similarly cut to form the opposite sides 14, handle portion 15, carton handle engaging lug 16 foldable on line 17, opposite compartment end wall 18 foldable on line 19, and carton retaining lug 20. While the end wall 18 and lug 20 are identical with end wall 9 and lug 12, they are diagonally positioned in the blank and attached to side portions 14 diagonally opposite to the attachment of end 9 and lug 12 to sides 5, respectively, as shown in Fig. 1. Said blank is cut along the line 21 to form the outer compartment end portion 22 and foldable or bendable on lines 23 to form the flanges 24 adapted to engage the inner surfaces of sides 5 and 14 when end 22 is bent upwardly on line 25, as will hereinafter appear. The opposite end 26 is formed and foldable similar to end 22. Sides 14 are foldable on line 27. The fold lines 13, 27, and 25 define the bottom 28 which not only constitutes the bottom for the two end compartments F and G but likewise for the space C and it is adapted to support the carton D or other container, as will be understood.

In order to erect the carrier or container B, ends 22 and 26 are folded on lines 25 at right angles to bottom 28, and flanges 24 are folded on lines 23 at right angles to said ends. Sides 5 and 14 are folded respectively on lines 13 and 27 at right angles to bottom 28 and bent in meeting directions to engage the substantially arcuate edges 9' and 18' of compartment end walls 9 and 18 to form top sections 5' and 14', and the respective handle portions 6 and 15 are bent on lines 29 and brought into overlying engagement with each other and spot welded or otherwise united to form the unitary handle E. The sides 5 and 14 are welded or otherwise secured to walls 9 and 18 and flanges 24 to firmly unite the parts to form said food compartments F and G.

Each of the compartments F and G has an end closure 30 conforming to the arched configuration of the compartment and formed along its edges with a lateral flange 31 for engagement over the edge of the compartment. Said closures 30 are hinged to ends 22 and 26 by hinges 32 welded or otherwise suitably secured to said ends and closure members. A spring catch or other suitable means 33 may be secured to the upper surface of said compartments to normally maintain the closures 30 in closed position.

The carton D is of similar configuration to that of compartments F and G with corresponding inwardly and upwardly extending top portions 34 and 35 terminating in handle portions 36 and 37 substantially corresponding in configuration to handle portions 6 and 15 of the carrier. Sides 34 and 35 are formed with a series of openings 38 through which are adapted to project the upper portions 39 of beverage bottles 40, as will be well understood. The handle portions 36 and 37 are formed with hand grip openings 41 and when the carton is in position in space C opening 41 of handle portion 36 is adapted to receive lug 7 and opening 41 of the handle portion 37 similarly receives lug 16, which lugs together with retaining elements 12 and 20 retain the carton within the carrier, thereby effecting a combined beverage and food carrier or container comprising a trio of carrying sections.

In Figs. 5, 6, and 7 there is shown a blank Aa from which is constructed a slightly modified form of carrier Ba having space Ca in which is adapted to be carried a food container or bottle carton package as desired.

The blank Aa is cut along its outer edges as at 42, 43, and 44 and formed with a cut out portion 45 to form the side portions 46, side top portions 47, handle portion 48, carton handle engaging lug 7a foldable on line 8a, compartment inner wall 49 cut along the line 50, and container retaining lug 51, as will be apparent. End wall 49 is adapted to be bent along the line 52 at right angles to sides 46, as shown in Fig. 6, to form the compartment end wall. This forms one side and the inner end wall of one of the compartments when bent at right angles to bottom 53 on line 54. The other side of the carrier or container, foldable at right angles to said bottom 53 on lines 55, is cut and stamped out similar to the side portion of the carrier just described to form sides 56, side top portions 57, handle portion 58, carton handle engaging lug 16a bent on line 17a, compartment inner end wall 59 cut along the line 60, and container retaining lug 61, as will be apparent. Said end 59 is adapted to be bent on line 62 similar to the end wall 49. The compartment end portions 49 and 50 and container retaining lugs 51 and 61 are connected to their respective sides 46 and 56 at diagonally opposite points similar to the corresponding portions 9, 18, 12, and 20 described in connection with Fig. 1. Said blank Aa is formed similar to blank A with the opposite compartment end wall portions 63 and 64 bendable upwardly on lines 65 with their edges 66 welded or otherwise connected to side portions 46 and 56. Said end portions 63 and 64 are formed along their upper edges with semi-circular cut out openings 67 and adapted to be bent inwardly on lines 68, as shown in Figs. 6 and 7, to receive the upper ends 39 of bottles 40, as will be well understood.

The carrier Ba is erected in a manner similar to carrier B. Ends 63 and 64 are bent upwardly on lines 65 and sides 46 and 56 are similarly bent upwardly at right angles to bottom 53 and at the upper edges of ends 49 and 59, as at 69, inwardly in meeting directions to points of engagement, as at 70, bringing the end portions 48 and 58 into overlapping engagement to be united by spot welding, gluing, or otherwise, depending upon the material from which the carrier is formed, to form the handle Ea similar to handle E of carrier B.

In this form the bottles 40 are adapted to be carried in the end compartments and a suitable food container carried in space Ca, or, if desired in connection with picnics or other gatherings, the three sections Ca, Fa, and Ga may be utilized for carrying bottled beverages, by simply substituting carton D for the food container in space Ca, with its handle portions engageable over lugs 7a and 16a similar to lugs 7 and 16, as shown in Fig. 4. The compartment end and side walls are connected by being spot welded, glued, or otherwise united depending upon the particular requirements.

From the above it will be apparent that I have designed a combination food and bottled beverage carrier constructed from a blank of suitable material, easily stamped, folded and united to form a container comprising spaced compartments and an intervening space having a common bottom adapted to support a container, means for retaining the container in the carrier, said carrier being simple in construction, manufacturable at a negligible cost, handy to carry, and versatile in its adaptive use as a food and beverage carton carrier or completely as a beverage carrier, as desired.

Although in practice I have found that the form of my invention illustrated in the accompanying drawings and referred to in the above description as the preferred embodiment, is the most efficient and practical; yet realizing the conditions concurrent with the adoption of my invention will necessarily vary, I desire to emphasize that various minor changes in details of construction, proportion and arrangement of parts, may be resorted to within the scope of the appended claims without departing from or sacrificing any of the principles of this invention.

Having thus described my invention, what I desire protected by Letters Patent is as set forth in the following claims:

1. A food and carton beverage carrier including compartments having a space therebetween, said space adapted to contain a bottled beverage carton having sides extending upwardly and inwardly into meeting engagement and terminating in upwardly projecting parallel handle grip members, said compartments having sides, ends, and bottoms, means interconnecting said compartments and forming a bottom for said space, said compartment sides arcuately converging into meeting engagement to form compartment top portions, said side and top portions constituting in effect continuations of the corresponding carton portions, upwardly extending overlapping handle portions interconnecting the top portions of the compartments adapted to substantially coincide with the carton handles when the latter are brought into overlying position therewith, lugs carried by the carrier handle structure for supporting engagement with the carton handle members, and means in connection with the carrier for retaining said carton in position.

2. A food and bottled beverage carrier having an open centrally disposed carton receiving space constructed from a blank of suitable material, said blank being stamped out to form a bottom section and a compartment outer end section at each end of the bottom section, respective spaced side sections extending from opposite sides of the bottom and connected at their respective free ends by a handle section, a flap portion connected to a diagonally opposite side portion and at diagonally positioned points with respect to the bottom section foldable at right angles to said sides to form compartment inner wall portions, the outer end sections and respective side sections being foldable at right angles to the bottom section to form spaced compartments having a common bottom, the upper opposed side portions being foldable towards each other into meeting engagement above the compartments, and the handle sections foldable at said points of engagement into overlapping engagement to form a handle, said folded parts at points of engagement being suitably united and said handle sections being formed with portions foldable outwardly and upwardly constituting lugs adapted to supportingly engage the handle of said carton.

3. A food and beverage carrier comprising spaced compartments forming an intermediate space adapted to carry a container having an upstanding handle, said compartments having side, end, and bottom portions, the side portions of the respective compartments extending upwardly and inwardly into meeting engagement, handle means connecting the side portions of the compartments at their points of engagement, lug means carried by said handle for retaining engagement with said container handle, a supporting bottom means connecting the lower portions of said compartments, the outer end walls of the respective compartments extending inwardly at an angle from a point adjacent their upper edges and having a plurality of bottle engaging cut out portions formed therein.

4. A food and carton beverage carrier comprising spaced compartments having sides, end walls, and a common bottom, said sides converging into meeting engagement to form compartment top portions, integral handle members interconnecting the top portions of each compartment at their points of engagement and extending at substantially right angles therefrom and in meeting engagement, said members being formed with outwardly extending elements, the space intermediate said compartments adapted to receive a carton of a configuration corresponding to that of said compartments and having handle portions of a configuration adapted to substantially coincide with said carrier handle and constitute therewith a common handle means for said carton and carrier when brought into engagement with said elements, and means for retaining said carton in said space, said walls of the carrier constituting in effect continuations of the side portions of the carton.

WALPOLE BREWER.